April 21, 1942.　　M. W. HUBER　　2,280,434
ICE CREAM FREEZER
Filed May 3, 1940　　5 Sheets-Sheet 1
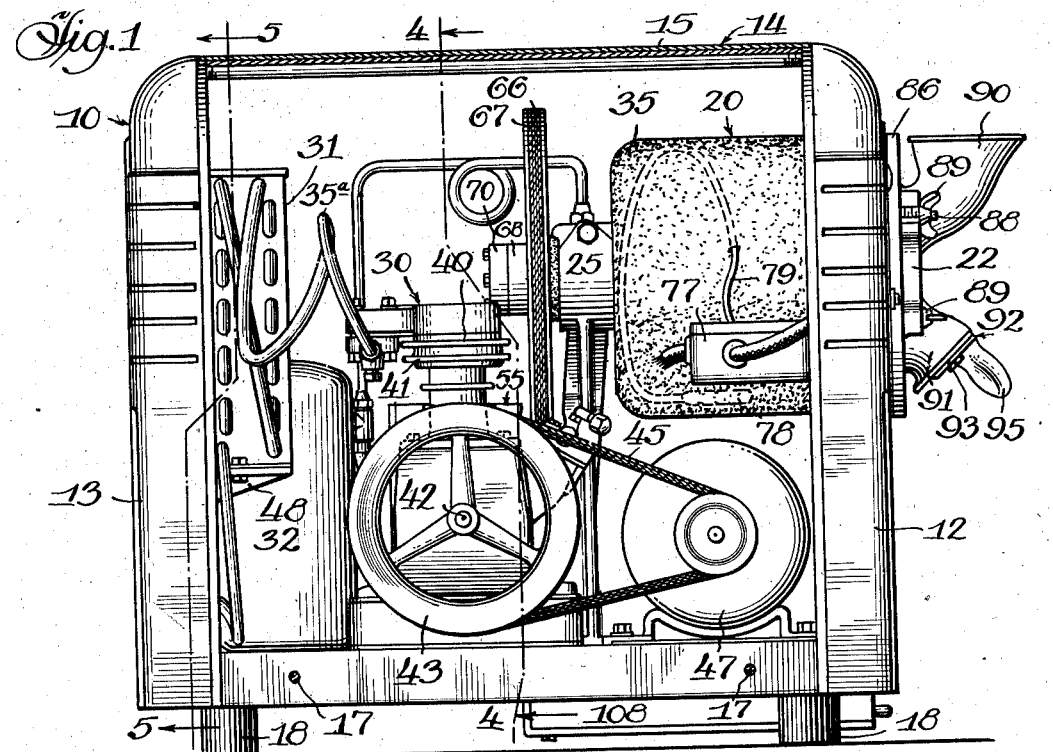
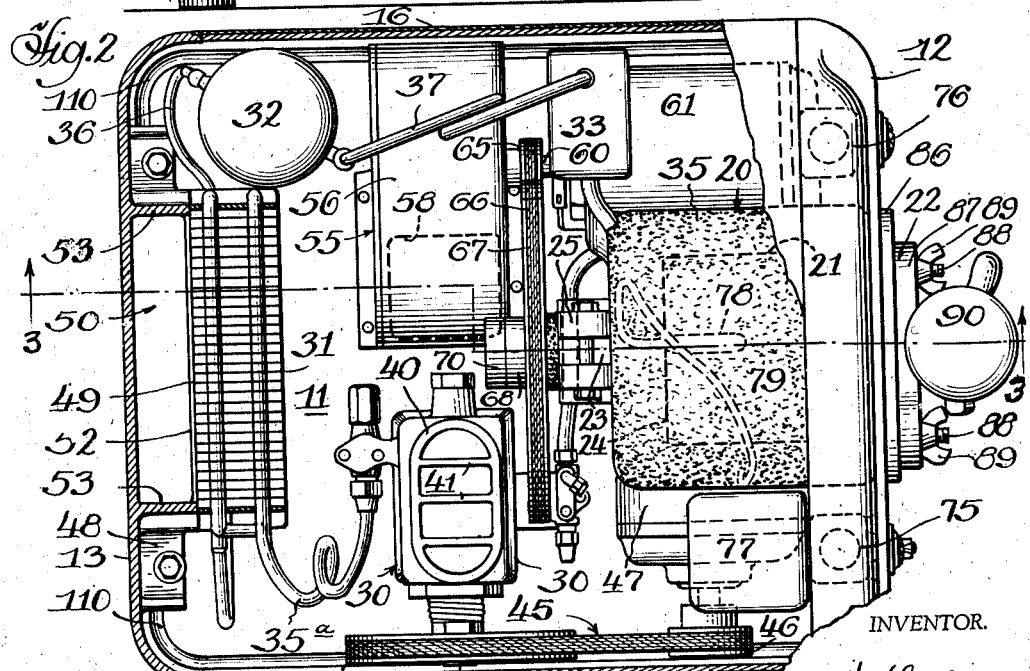

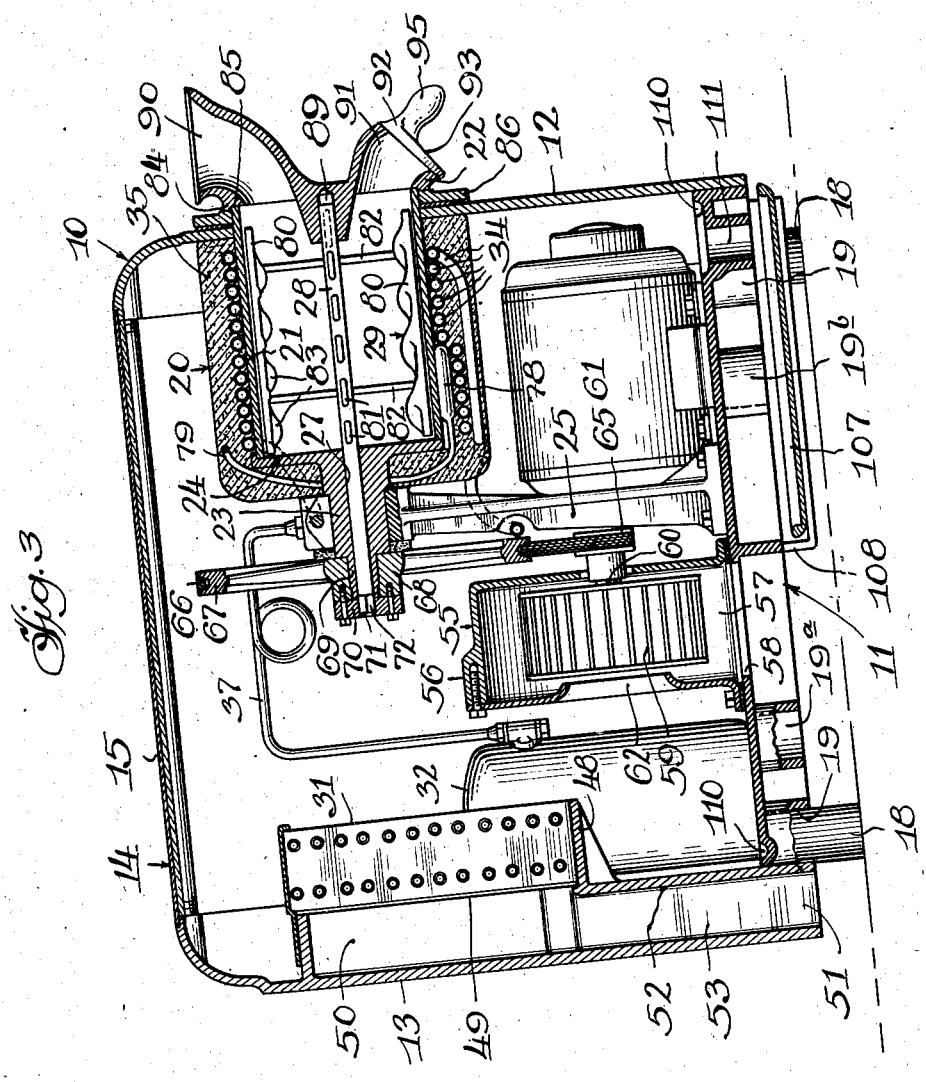

April 21, 1942.    M. W. HUBER    2,280,434
ICE CREAM FREEZER
Filed May 3, 1940    5 Sheets-Sheet 3
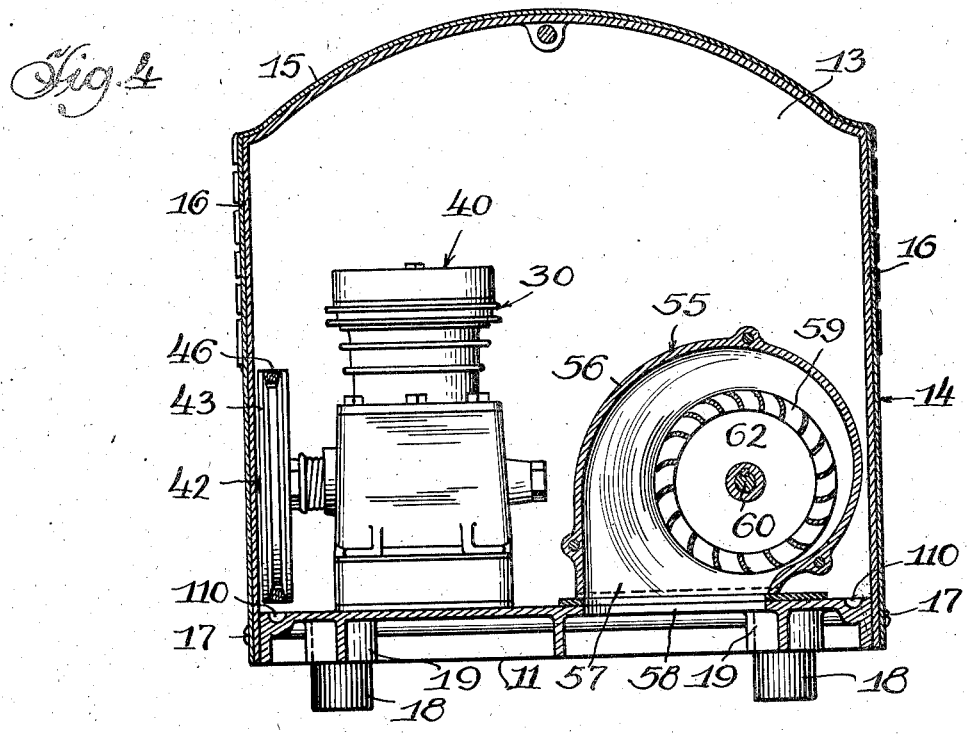
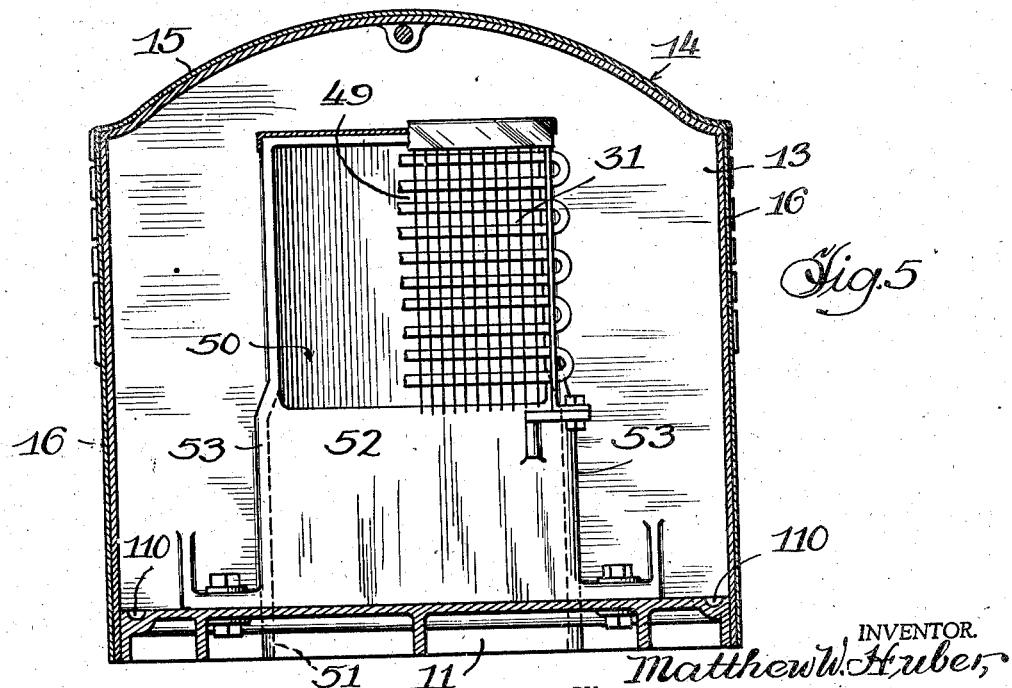
INVENTOR.
Matthew W. Huber,
BY
ATTORNEYS.

April 21, 1942.  M. W. HUBER  2,280,434
ICE CREAM FREEZER
Filed May 3, 1940  5 Sheets-Sheet 4
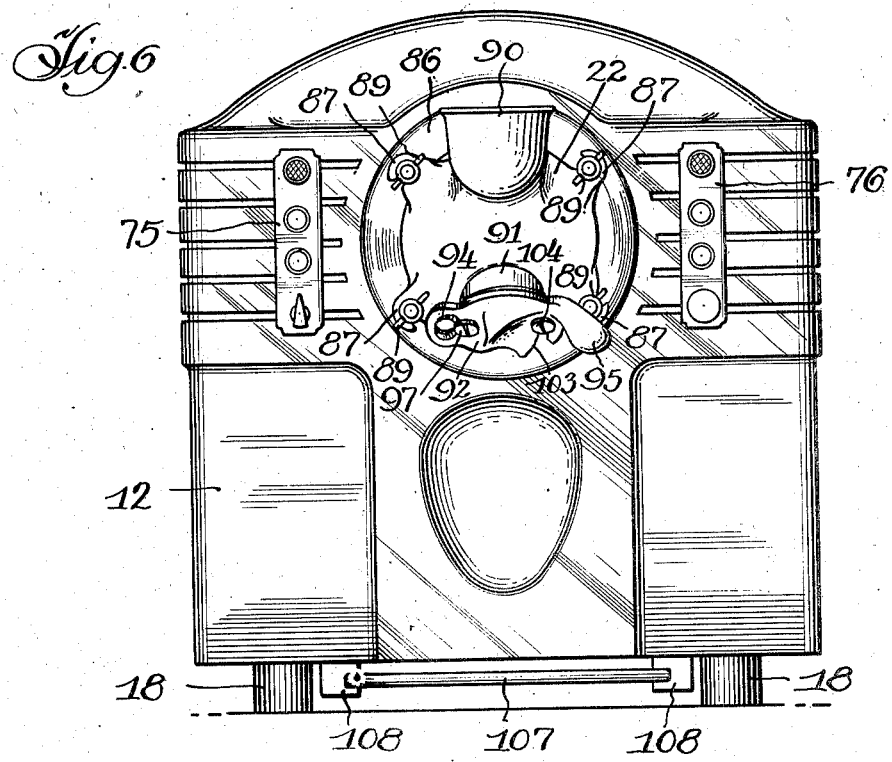
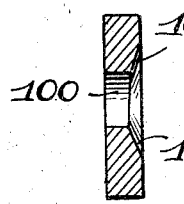
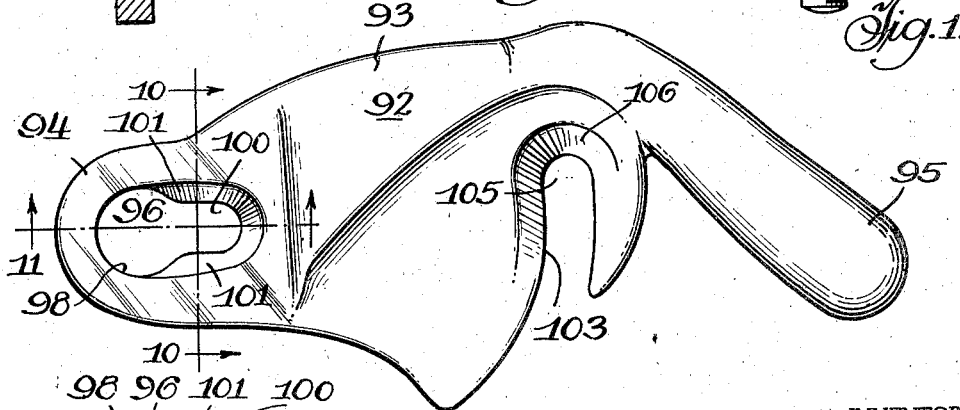
INVENTOR.
Matthew W. Huber,
BY
Offield Mellhope ...
ATTORNEYS.

April 21, 1942.  M. W. HUBER  2,280,434
ICE CREAM FREEZER
Filed May 3, 1940  5 Sheets-Sheet 5
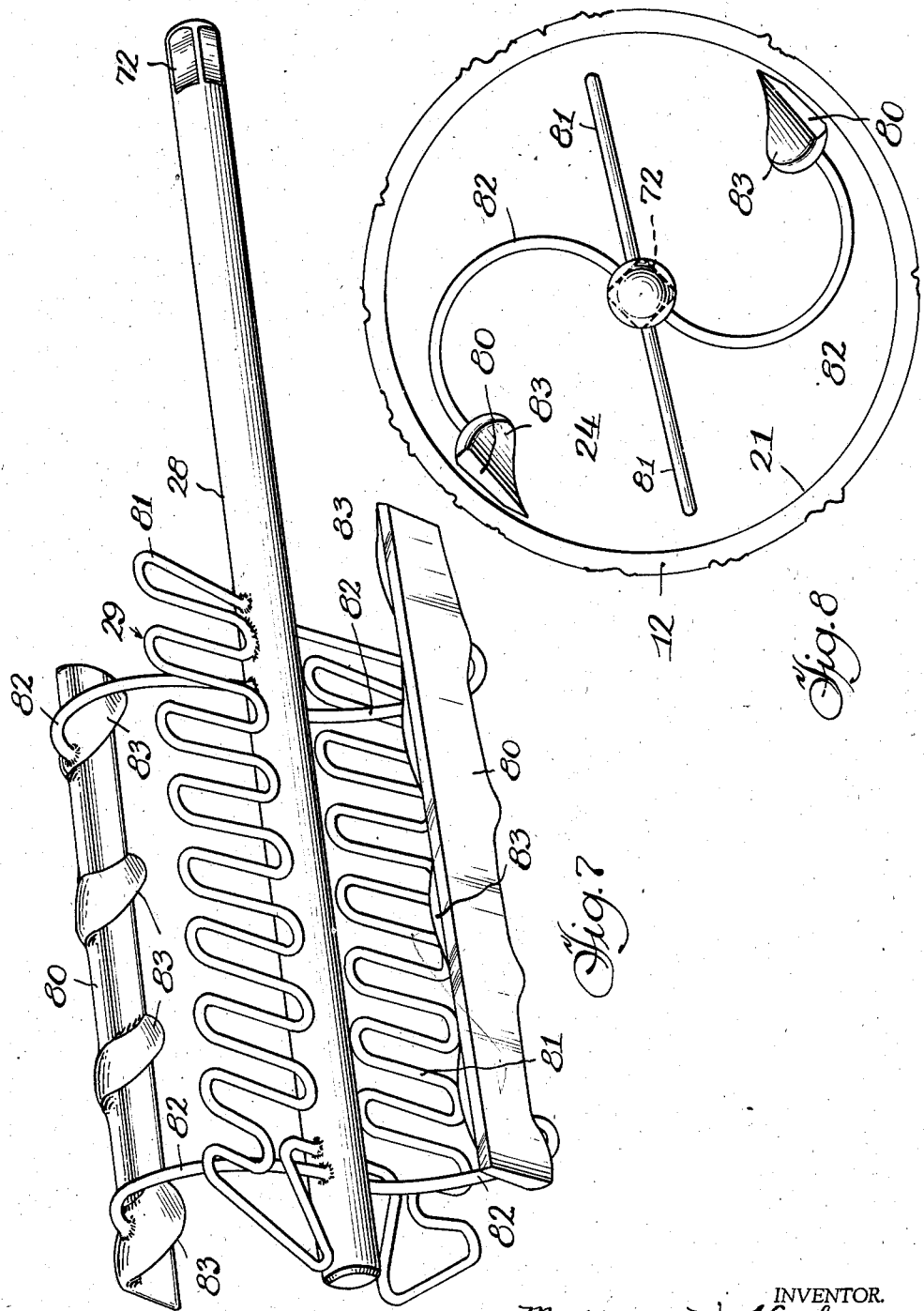
INVENTOR.
Matthew W. Huber,
BY
Offield Melchope Reed & Poole
ATTORNEYS.

Patented Apr. 21, 1942

2,280,434

UNITED STATES PATENT OFFICE 2,280,434

ICE CREAM FREEZER

Matthew W. Huber, Chicago, Ill., assignor to Tuthill Pump Company, Chicago, Ill., a corporation of Illinois Application May 3, 1940, Serial No. 333,118

5 Claims. (Cl. 62—114)

This invention relates to improvements in portable ice cream freezing machines of the type especially adapted for installation on store counters or stands and designed so that the proprietor or attendant may make ice cream in relatively small batches for dispensing direct to the consumer.

Freezing machines of the general class described usually consist of a self-contained unit including a small freezer compartment with an electrically operated refrigerating plant and a power-operated stirring device, all mounted within a casing and arranged for convenient manipulation and control by the operator.

One of the principal difficulties encountered in the design of machines of the class above described is that of insuring proper ventilation of the closely confined mechanism within the casing, so as to avoid extremes in temperature between the various operating parts which not only affect the proper functioning of the machine, but tend to produce excessive sweating or condensation at localized points both within and without the casing.

One of the principal objects of my invention is to provide means for maintaining air currents throughout the interior of the casing sufficient not only to cool the condenser, but also to cool the compressor and the electric motor driving means for the compressor and the ice cream stirring mechanism, and to temper the exposed metallic parts associated with the expansion coil and freezer chamber, and thus minimize localized temperature differences and eliminate excessive condensation or "sweating" within and without the casing. To attain these objectives, I provide an improved ventilation system including a forced draft blower for exhausting the air from the casing, and an inlet duct and condenser so arranged as to discharge the incoming air throughout the entire interior of the casing and thus reach all of those parts therein normally subject to excessive variations in temperature, with the exception, of course, of the freezer chamber and expansion coils, which are suitably insulated against the absorption of heat.

Another object of the invention is to provide an improved and simplified arrangement of mounting for the control thermostat on the exterior of the freezer chamber, but inside of the expansion coils surrounding the latter.

Among other objects of the invention are to provide an improved, simplified and more sanitary dasher blade mounting so as to eliminate all hinged joints and facilitate the removal and replacement of the dasher for cleaning purposes. A further object of the invention is to provide an improved form of removable closure for the draw-out gate. Other objects and advantages will appear as the following description proceeds.

The invention may best be understood by reference to the accompanying drawings illustrating a preferred embodiment thereof. In the drawings:

Fig. 1 is a side view of a freezer unit constructed in accordance with my invention, with the side wall of the cover broken away to show the operating mechanism and its arrangement within the casing.

Fig. 2 is a plan view of the unit shown in Fig. 1, with the cover broken away to show the operating mechanism therein.

Fig. 3 is a sectional view taken generally along line 3—3 of Fig. 2.

Fig. 4 is a sectional view taken on line 4—4 of Fig. 1.

Fig. 5 is a sectional view taken on line 5—5 of Fig. 1.

Fig. 6 is a front view of the casing, showing the removable end mounting for the freezer compartment including the feed funnel and the draw-out gate.

Fig. 7 is a detail perspective view of the dasher and its spring-mounted blades.

Fig. 8 is a detail front view showing the freezer chamber with its end plate removed, and with the dasher mounted therein.

Fig. 9 is an enlarged detail view of the draw-out gate.

Figs. 10 and 11 are detail sections of the draw-out gate taken on lines 10—10 and 11—11, respectively, of Fig. 9.

Fig. 12 is a detail view of the pivot bolt for retaining the draw-out gate.

Referring now to details of the embodiment of my invention illustrated in the drawings, the freezer unit casing is indicated generally at 10, and has as its main elements a base 11, front wall 12, rear wall 13, and a sheet metal cover 14 enclosing the top and sides of said casing to form a completely enclosed compartment. In the form shown herein, the cover 14 is made in a single piece including a top panel 15 and side panels 16, 16 detachably connected by any suitable means such as cap screws 17 to opposite sides of the base 11.

The base 11 is supported on a plurality of legs herein consisting of four cylindrical members 18, 18 of rubber or similar semi-yieldable material, which are detachably mountable in sockets 19, 19 formed in the under side of the base, as shown in Fig. 3. In the form shown, a plurality of such sockets are provided adjacent each corner of the base as indicated at 19ª, 19ᵇ, so as to permit variation in the spacing of the legs when it is necessary to accommodate the device to counters or supporting stands of limited size.

The freezer chamber 20 consists of a horizontally disposed cylindrical shell 21 having its front end supported by and extending through the front wall 12 adjacent the top thereof, so that its full diameter may be opened toward the front of the casing, as shown in Fig. 8. The front of said freezer chamber is normally closed during operation of the machine, however, by a detachable end plate 22, details of which will presently be described.

The freezer chamber 20 is supported at its rear end by an annular bearing support 23 formed rigid with the inner end plate 24 of said chamber, and concentric therewith. Said bearing support is mounted on a bracket 25 extending upwardly from the base 11. The end plate 24 and bearing support 23 have a bore 27 extending therethrough which forms the bearing for the inner end of the shaft 28 of a rotatable dasher 29. The outer end of said dasher shaft has bearing in the detachable end plate 22 when the latter is in closed position, as shown in Fig. 3.

The refrigerating mechanism herein disclosed is generally of the conventional direct expansion type, including as its main elements a compressor 30, condenser 31, a receiver 32, expansion valve 33, and an expansion coil 34 surrounding the freezer compartment shell 21. The portions of expansion coil and freezer compartment which project inwardly from the front wall, are covered with a suitable insulating jacket 35, as clearly seen in Fig. 3. The connections between the various elements of the mechanism may be of the usual kind, as for instance a tube 35 leading from the compressor 30 to the condenser, a tube 36 from the condenser to the receiver 32, and a tube 37 from the receiver to the expansion valve 33. The expansion valve may be of any well-known construction, details of which are not shown herein as it forms no part of the present invention.

The compressor 30 shown herein is of the reciprocating type, having a compression head 40 with cooling fins 41 of conventional form, and a shaft 42 with a belt pulley 43 at one end thereof. The compressor is driven by an electric motor 47 through a belt 45 and drive pulley 46. In the preferred arrangement illustrated herein, the motor 47 is mounted on base 11 next to the front wall 12 and below the overhanging portion of the freezer chamber 20.

The condenser 31 may be the usual fin radiator type, as shown, and is supported on a bracket 48 adjacent the rear wall 13 so as to extend across the discharge opening 49 of an air inlet duct indicated generally at 50. Said duct has an inlet 51 at the bottom of the rear wall 13 and extends upwardly along said wall to the discharge opening 49. In the form shown herein, said air inlet duct is defined by an inner wall 52 and connecting side walls 53, 53, all formed integrally with the rear wall 13. The arrangement is such that the air entering the casing is directed forwardly into the upper part of the casing over a relatively wide area.

Circulation of air through the casing is promoted by a blower 55 having a casing 56 mounted on the base 11 with its discharge opening 57 registering with an aperture 58 in said base. Said blower has a rotary impeller 59 of the usual form mounted on the end of shaft 60 of an electric driving motor 61. In the preferred arrangement disclosed herein, the blower inlet 62 opens toward the rear wall 13 of the casing, but is disposed generally below the level of the inlet discharge opening 49 and condenser 31, as shown in Fig. 3.

The driving motor for the blower is mounted on base 11 below the overhanging portion of the freezer chamber 20 on the side opposite the compressor drive motor 47, and with its drive shaft 60 extending parallel to the side wall of the casing, as clearly shown in Figs. 1 and 2. The blower 55 is disposed to the rear of the freezer chamber and opposite the compressor 30.

The motor 61 also drives the dasher shaft 28 through a pulley 65 fixed on the motor shaft 60, a belt 66, and larger pulley 67. Said larger pulley has a hub 68 rotatably mounted on a reduced bearing extension 69 at the rear end of the freezer chamber support 23. The pulley hub carries an end plate 70 fitting over the inner end of the bearing extension 69 and provided with a squared aperture 71 adapted to form a socket for detachably receiving the squared inner end 72 of the dasher shaft 28, when the latter is mounted in operative position in the freezer chamber 20.

The two driving motors 47 and 61 may be controlled as usual by suitable electric switch devices such as push-button switch boxes 75 and 76, respectively, conveniently mounted on the front wall 12 for control from the front of the latter, as indicated in Figs. 2 and 6. However, the switch 75 controlling the compressor motor, preferably has an automatic thermostat control switch mechanism associated therewith, indicated generally at 77, of the kind usually employed in refrigerating devices of this character, and arranged so as to cut off the motor circuit when the freezing temperature exceeds a predetermined value. The construction and operation of such automatic temperature control switches are well known to those skilled in the art, so details thereof need not be described herein, excepting to point out the novel arrangement of the electric thermostat element 78 associated therewith.

The thermostat element 78 is of the charged element type, enclosed in an elongated casing and connected to the automatic control switch mechanism 77 by a hollow cable 79. Said thermostat element is inserted between the outer surface of the freezer chamber shell 21 and the expansion coil 34, the tubes forming said coil being arched outwardly from the shell at one point sufficiently to accommodate said thermostat element. With this arrangement, the thermostat is directly responsive to the temperature conditions of the freezer chamber wall.

The dasher 29 carries two blades 80, 80, spaced from and parallel with the shaft 28, in position to agitate the contents of the freezer chamber and scrape the interior walls thereof while the machine is in operation. A plurality of radial agitator arms 81, 81 are also mounted on the shaft. In the novel form shown herein, each of the blades 80, 80 is connected to the shaft by a pair of heavy wire springs 82, 82 fixed to the rear edge of said blade and arched rearwardly and then inwardly to the shaft, so that the entire blade is yieldably connected to the dasher shaft without any pivotal connecting devices such as are commonly employed. The inner faces of the blades may also have a plurality of laterally biased ridges 83, 83 spaced therealong and inclined toward the outer end of the freezer chamber as shown, to promote agitation and circulation of the freezer contents and to assist in discharging the contents from the freezer chamber when the draw-out gate is opened. As will be seen in Fig. 8, the dasher blades are generally wedge-shape in cross section, and the springs 82, 82 are fixed thereto so that the front edge of each blade is inclined outwardly into scraping position relative to the interior walls of the freezer shell. In the preferred arrangement illustrated in Fig. 8, the springs 82, 82 are initially bent so that the scraper edges of the blades will be spaced slightly from the inner surface of the freezer shell when the dasher is inserted therein. When the machine is put into operation, however, the resistance of the contents of the freezer, acting on the inclined inner surfaces of said blades, will force the latter outwardly into scraping engagement with the side walls. This yieldable mounting for the blades facilitates the insertion and removal of the dasher, and permits the blades to exert substantially uniform scraping pressure throughout their length, when the machine is in operation. It also eliminates wear, noise, difficulty of cleaning, and other disadvantages usually present in hinged blade mountings of the usual form.

Referring now to details of the detachable end plate 22 which closes the front end of the freezer chamber, said plate has an annular shoulder 84 fitting over the rim portion 85 of the freezer chamber shell 21. Said rim portion is fixed in and projects slightly beyond an annular supporting plate 86 secured against the front wall 12 of the casing. The end plate 22 has a plurality of hook-like lugs 87, herein four in number, projecting radially at spaced intervals around its periphery, and arranged to engage a plurality of registering headed bolts 88 disposed concentrically on the supporting plate 86 by partial rotation of said end plate. Wing nuts 89, 89 are mounted on the ends of bolts 88 to lock the end plate in liquid-tight position against the front end of the freezer shell 21, as shown in Fig. 3. When the end plate is in closed position, the front end of the dasher shaft 28 is supported in a socket 89' formed concentrically on the inner face of said end plate.

The end plate 22 also has an upwardly opening filling funnel 90 integrally formed near the top thereof, for introducing the mix into the freezer chamber, and a draw-out or discharge port 91 near its lower edge, opposite the bottom of the freezer chamber. The discharge port is covered by a novel form of draw-out gate indicated at 92.

Details of the draw-out gate 92 are shown in Figs. 9, 10 and 11. It consists of a relatively flat closure member 93 having a pivot extension 94 at one side and a handle 95 at the other. The pivot extension has an aperture 96 formed therein, adapted to engage a pivot pin 97 fixed in the front of the end plate. The aperture 96 includes an enlarged opening 98 permitting the head 99 of the pivot pin 97 to pass therethrough, and a restricted slot 100 extending inwardly therefrom. The margins of the slot 100 are beveled or champfered, as indicated at 101, and the lower surface of the head 99 is also beveled, as indicated at 102. The margin of the closure body opposite the pivot extension 94 is formed with a cam surface 103 adapted to coact with a pin 104 similar to the pivot pin 97, said cam surface terminating in a recess 105 with a beveled margin 106, as indicated in Fig. 8. The cam surface 103 is arranged on a slightly eccentric arc relative to the pivot aperture 96.

The arrangement just described is such that when the gate is detachably mounted on a pin 97 and swung towards its closed position, the cam surface 103 will engage the pin 104 so as to move the body of the gate toward the pivot pin 97 with a wedging action. The overhanging beveled surface 102 of the pivot pin coacts with the beveled surface 101 along the margins of the restricted slot 100 during this movement, and at the same time the beveled surface 106 on pin 104 engages the beveled margins of recess 105 so that the gate is forced by wedging action into liquid-tight engagement against the draw-out port when said gate is finally secured in locked position thereagainst.

For convenience in filling containers from the draw-out gate, a tray 107 is telescopically mounted between a pair of longitudinally disposed flanged supporting rails 108 depending below the base 11. The tray is thus in position to be extended into supporting position below said draw-out gate, when desired, but may be fully retracted beneath the base when not in use, as shown in Fig. 3.

As a precaution against water that may get into the casing, as for instance through the dasher shaft bearing 27 and also resulting from excessive condensation or sweating which may occur under some conditions, I provide the base 11 with a drain trough or gutter 110 formed integrally therein around the outer margin of said base adjacent the upright walls, as indicated in Figs. 3, 4 and 5. Said drain trough communicates with a discharge spout 111 extending through the base adjacent the front wall, and arranged to drain into the tray 107 (see Fig. 3).

Among the special advantages of the construction of the machine above described is the especially compact arrangement of the several operating parts, including the horizontally disposed freezer chamber and its supporting means, together with a forced air cooling system which is ductless between the condenser 31 and blower inlet so as to ventilate the entire inside of the casing. It will be observed that the condenser is disposed centrally at a relatively high level on the rear wall, and that the incoming air is discharged upwardly and forwardly therethrough toward the front wall, above the level of the blower inlet, so that the moving air is diffused generally throughout the entire interior of the casing before it is drawn out through the blower inlet. It will further be observed that the air is initially directed across the compressor head to cool the same, and toward the freezer chamber so as to have surface contact with the inner face of the front wall immediately surrounding said chamber. Since the shell 21 of the freezer chamber is in direct supporting engagement with the metal front wall, this portion of the front wall becomes chilled during the operation of the freezer and would be especially subject to sweating both on the interior and exterior of the casing were it not for the tempering effect of the air current directed therein as above described. From the front wall of the casing the air is turned back so as to be diffused throughout the casing, a substantial portion of the moving air coming into surface contact with the drive motors 47 and 61 located immediately below the freezer so as to cool said motors. Thus the diffused air currents reach all of the operative parts of the casing and minimize troubles often due, on the one hand, to excessive heating of certain machine parts, and on the other to excessive sweating of exposed colder machine parts. The blower with its suction intake, insures more positive, continuous and yet diffused air circulation through the casing, than is provided by a rotary fan of the pusher type commonly employed in refrigerating devices of this general character.

Although I have shown and described one particular embodiment of my invention, it will be understood that I do not wish to be limited to the exact construction shown and described, but that various changes and modifications may be made without departing from the spirit and scope of my invention as defined in the appended claims.

I claim as my invention:

1. In an ice cream freezer, an enclosed casing including a base and front and rear walls, a freezer chamber supported on the front wall and having a refrigerating coil surrounding a portion of said freezer chamber within said casing, detachable closure means affording access to said freezer chamber through said front wall, refrigerating mechanism for said refrigerating coil disposed within said casing, including a compressor and a condenser, air inlet means at the rear end of said casing including a duct having a forwardly-opening discharge passage, said condenser extending over said inlet discharge passage so that the incoming air will be directed forwardly in said casing toward the front wall over a widely extended area, and a blower mounted on said base within said casing having its suction inlet disposed in generally offset relation with the line of discharge from said air inlet, whereby the incoming air will be forced in diffused currents throughout substantially the entire interior of the casing while passing from the inlet discharge passage to the blower.

2. In an ice cream freezer, an enclosed casing having a base and upright front and rear walls, a cylindrical freezer chamber having one end supported by and projecting through said front wall adjacent the top thereof, detachable closure means for the open end of said freezer chamber affording access to the latter from the exterior of the front wall, refrigerating mechanism enclosed in said casing including a compressor mounted adjacent one side of said base, a condenser supported on said rear wall, and an expansion coil surrounding the portion of said freezer chamber extending into said casing, and cooling and ventilating means for the interior of said casing including an inlet duct adjacent said rear wall and having a discharge passage opening forwardly through said condenser into the upper part of said casing, and a blower mounted on said base adjacent the side opposite said compressor and communicating with a discharge passage through said base, said blower having an inlet offset from the line of discharge from said air inlet discharge passage whereby the incoming air will be forced in diffused air currents throughout substantially the entire interior of the casing while passing from the inlet discharge passage to the blower.

3. In an ice cream freezer, an enclosed casing including a base and an upright metallic front wall, a metallic freezer chamber supported directly on said front wall and having a refrigerating coil surrounding a portion of said freezer chamber within said casing, means affording access to said freezer chamber through said front wall, refrigerating mechanism for said refrigerating coil disposed within said casing, air inlet means at the rear end of said casing including a duct having a forwardly opening discharge passage, a blower in said casing having a suction inlet disposed in generally offset relation with the line of discharge from said air inlet whereby the air, in passing from said inlet discharge passage to said blower, will be directed toward said freezer chamber and along the exposed metal surfaces of said front wall surrounding said freezer chamber.

4. In an ice cream freezer, an enclosed casing including a base and front and rear walls, a freezer chamber supported in said casing and having means affording access thereto from the exterior of said casing, refrigerating mechanism enclosed in said casing including a refrigerating coil for said freezer chamber, a condenser, a compressor and a motor for driving said compressor, air inlet means for said casing including a duct having an inwardly facing discharge passage, a blower having a drive motor enclosed in said casing, said blower having its suction inlet disposed in generally offset relation from the line of discharge from said air inlet, the arrangement being such that the incoming air will be trained through said condenser and then in diffused currents into surface contact with said compressor and both of said driving motors while passing from the inlet discharge passage to the blower.

5. In an ice cream freezer, an enclosed casing including a base and an upright front wall, a freezer chamber supported on said front wall and projecting rearwardly into said casing, a refrigerating coil surrounding a portion of said freezer chamber within said casing, means affording access to said freezer chamber through said front wall, refrigerating mechanism for said refrigerating coil disposed within said casing, air inlet means in said casing including a duct having a discharge passage directed across said refrigerating mechanism so as to provide cooling means therefor, a blower in said casing having a suction inlet disposed in generally offset relation to the line of discharge from said air inlet duct whereby the air, in passing from said inlet duct to said blower, is directed in diffused currents toward said freezer chamber and along the exposed surfaces of said front wall surrounding said freezer chamber.

MATTHEW W. HUBER.